US012450058B2

(12) United States Patent
Unnikrishnan et al.

(10) Patent No.: US 12,450,058 B2
(45) Date of Patent: Oct. 21, 2025

(54) CONSTANT MEMORY SEGMENTATION FOR PARALLEL PROCESSORS

(71) Applicant: NVIDIA Corporation, Santa Clara, CA (US)

(72) Inventors: Deepak Cholayil Unnikrishnan, San Jose, CA (US); Ming Liang Milton Lei, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 43 days.

(21) Appl. No.: 18/311,408

(22) Filed: May 3, 2023

(65) Prior Publication Data

US 2024/0370260 A1 Nov. 7, 2024

(51) Int. Cl.
*G06F 9/30* (2018.01)
*G06F 8/41* (2018.01)
*G06T 1/60* (2006.01)

(52) U.S. Cl.
CPC ...... *G06F 9/30047* (2013.01); *G06F 9/30038* (2023.08); *G06F 8/441* (2013.01); *G06T 1/60* (2013.01)

(58) Field of Classification Search
CPC .. G06F 9/30047; G06F 9/30018; G06F 8/441; G06T 1/60
See application file for complete search history.

(56) References Cited

U.S. PATENT DOCUMENTS

| 9,496,047 | B2 | 11/2016 | Yang et al. |
| 9,710,275 | B2 | 7/2017 | Marathe et al. |
| 9,971,519 | B2 | 5/2018 | Romem et al. |
| 10,049,006 | B2 | 8/2018 | Reed et al. |
| 11,069,117 | B2 * | 7/2021 | Ford ..................... G06T 15/04 |
| 11,474,798 | B2 * | 10/2022 | Zhang ..................... G06F 8/441 |
| 11,481,865 | B2 * | 10/2022 | Kamenetskaya ...... G06N 3/045 |
| 11,887,211 | B2 * | 1/2024 | Khatib ..................... G06T 15/04 |
| 2017/0153945 | A1 | 6/2017 | Lam et al. |
| 2022/0058008 | A1 * | 2/2022 | Zhang ..................... G06F 8/441 |

* cited by examiner

*Primary Examiner* — Corey S Faherty
(74) *Attorney, Agent, or Firm* — Taylor Duma L.L.P.

(57) ABSTRACT

In various examples, constant memory segmentation for autonomous systems and applications is described herein. Systems and methods are disclosed that partition a constant memory into a number of segments. In some examples, the constant memory is partitioned into equally sized segments while, in some examples, the constant memory is partitioned into varying sized segments. The systems and methods may then use the segments in order to store only a portion(s) of the data from the constant memory in a cache memory (e.g., an on-chip cache). For instance, if an application(s) (e.g., a kernel(s) executing a portion of the application) uses only a portion(s) of the data from the constant memory, then the segments may be used to store the portion(s) of the data from the constant memory in the cache memory without storing another portion(s) of the data from the constant memory in the cache memory.

20 Claims, 13 Drawing Sheets

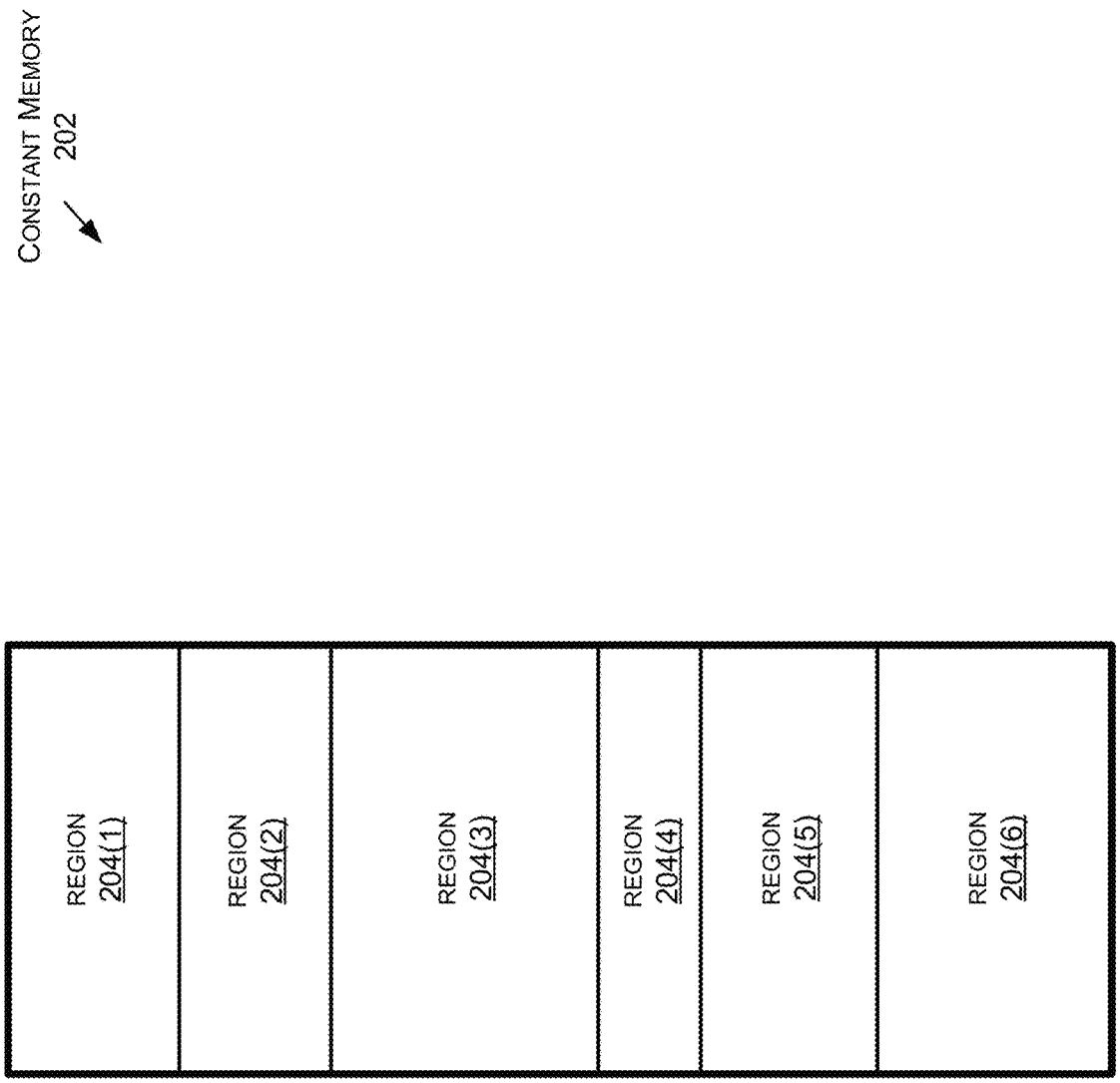

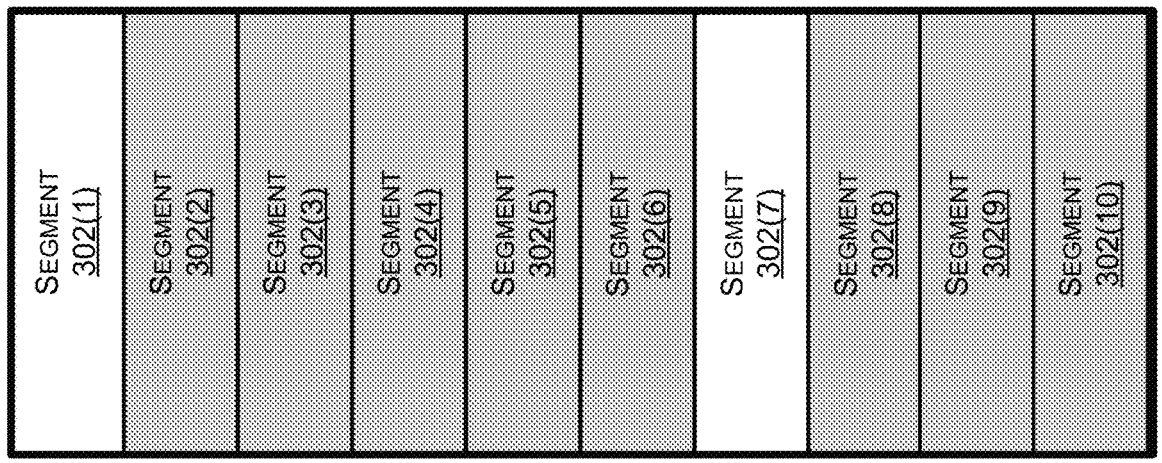
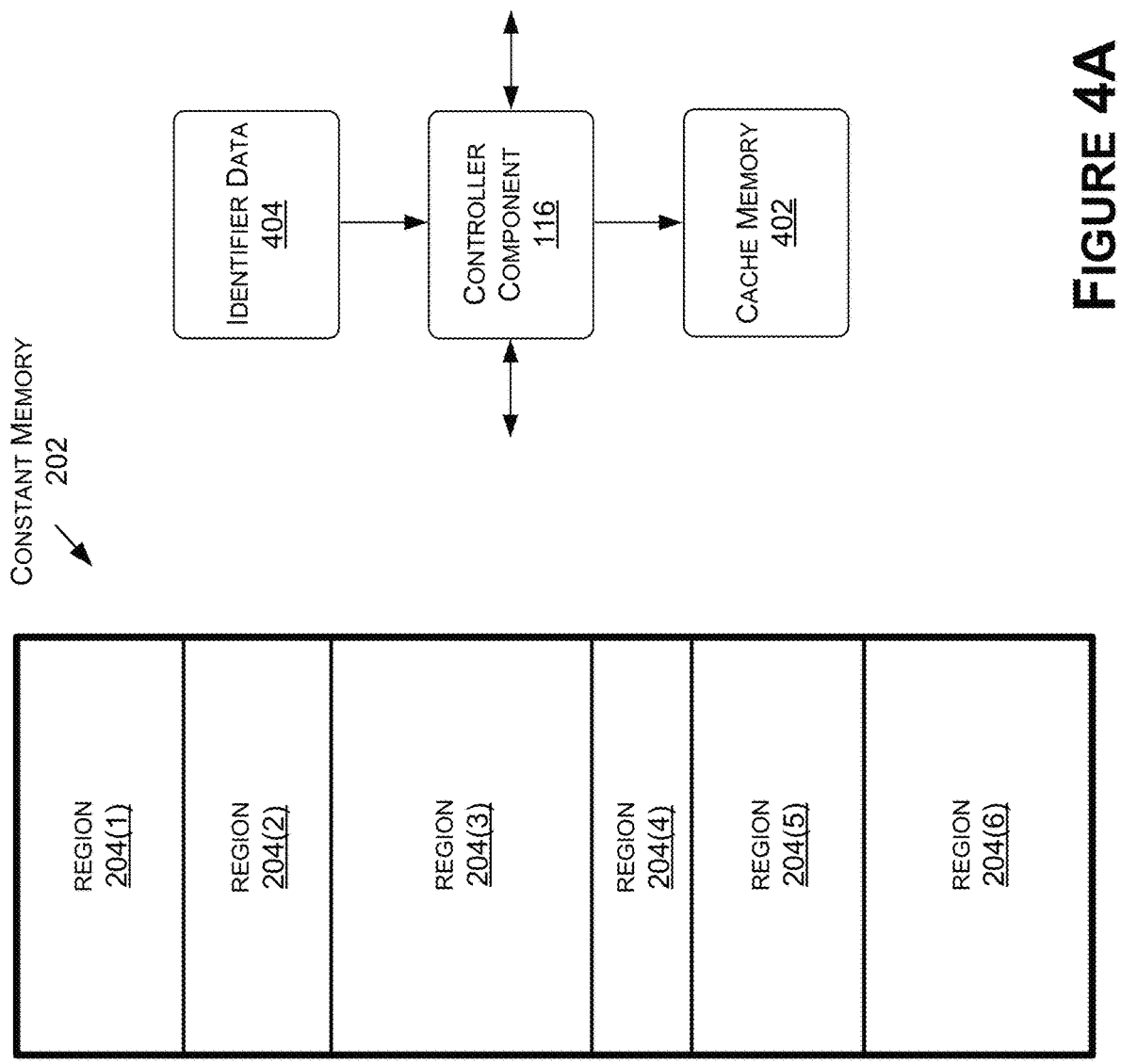
FIGURE 4A

CONSTANT MEMORY SEGMENTATION FOR PARALLEL PROCESSORS

BACKGROUND

Constant memory is a type of read-only memory that is reserved for storing kernel (e.g., CUDA kernel) launch attributes (e.g., constants) such as grid parameters, kernel parameters, user constants, and/or other constants. In some circumstances, the constants may be used to store read-only values in applications, such as weights associated with a neural network, that are processed by the kernels. Each kernel may use a fixed-size constant memory, where the constant memory is backed at least partially by an internal on-chip cache and/or an external cache. As such, the constants may need to be resident in the on-chip cache in order to achieve the highest application performance.

Currently, there are numerous approaches for storing the constants in the on-chip cache. For instance, one approach for storing the constants in the on-chip cache includes fetching the constants for storage in the on-chip cache when the constants are missing during a runtime of an application (e.g., when the application references the constant memory). Additionally, another approach for storing the constants in the on-chip cache includes fetching all of the data, including the constants, from the constant memory for storage in the on-chip cache before a kernel is launched. Yet another approach for storing the constant in the on-chip cache includes fetching all of the data, including the constants, from the constant memory for a next kernel after a current kernel is finished executing. However, each of these approaches for storing the constants in the on-chip cache includes performance issues.

For instance, since the first approach waits until the constants are missing from the on-chip cache, this may cause high rates of missing constants and/or increase latency, which will lower the performance of the application. Additionally, since the second and third approaches fetch all of the data from the constant memory, many lines of the constant memory that are not needed by the application are also fetched for storage in the on-chip cache. This may increase the overall rate of missing constants, increase the amount of data that is fetched and then stored in the on-chip cache, and/or may affect the performances of applications that are sharing the on-chip cache. In some circumstances, these problems may worsen when graphics processing units (GPUs) include larger constant memory and/or when the GPUs are shared between multiple devices.

SUMMARY

Embodiments of the present disclosure relate to constant memory segmentation for autonomous systems and applications. Systems and methods are disclosed that partition a constant memory into a number of segments. In some examples, the constant memory is partitioned into equally sized segments while, in some examples, the constant memory is partitioned into varying sized segments (using one or more of the processes described herein). The systems and methods may then use the segments in order to store only a portion(s) of the data from the constant memory in a cache memory (e.g., an on-chip cache). For instance, if an application(s) (e.g., a kernel(s) executing a portion of the application) uses only a portion(s) of the data from the constant memory, then the segments may be used to store the portion(s) of the data from the constant memory in the cache memory without storing another portion(s) of the data from the constant memory in the cache memory.

In contrast to conventional systems, such as those described above that use the first mechanism to store constants in the cache memory, the current systems, in some embodiments, are able to store the portion(s) of the data of the constant memory before the data (e.g., constants) is needed, which may reduce the latency and/or reduce the rate of missing constants. Additionally, in contrast to conventional systems, such as those described above that use the second and/or third mechanisms to store constants in the cache memory, the current systems, in some embodiments, do not store all of the data from the constant memory in the cache memory, but rather store the data from the portion(s) of the cache memory that is used by an application(s) (e.g., a kernel(s)). This may reduce the amount of data that is stored in the cache memory, which may again reduce the latency and/or reduce the rate of missing constants.

BRIEF DESCRIPTION OF THE DRAWINGS

The present systems and methods for constant memory segmentation for autonomous systems and applications are described in detail below with reference to the attached drawing figures, wherein:

FIG. 2 illustrates an example of a layout of a constant memory, in accordance with some embodiments of the present disclosure;

FIG. 4A illustrates an example of fetching data associated with equally sized segments for storage in a cache memory, in accordance with some embodiments of the present disclosure;

DETAILED DESCRIPTION

Figure 1:
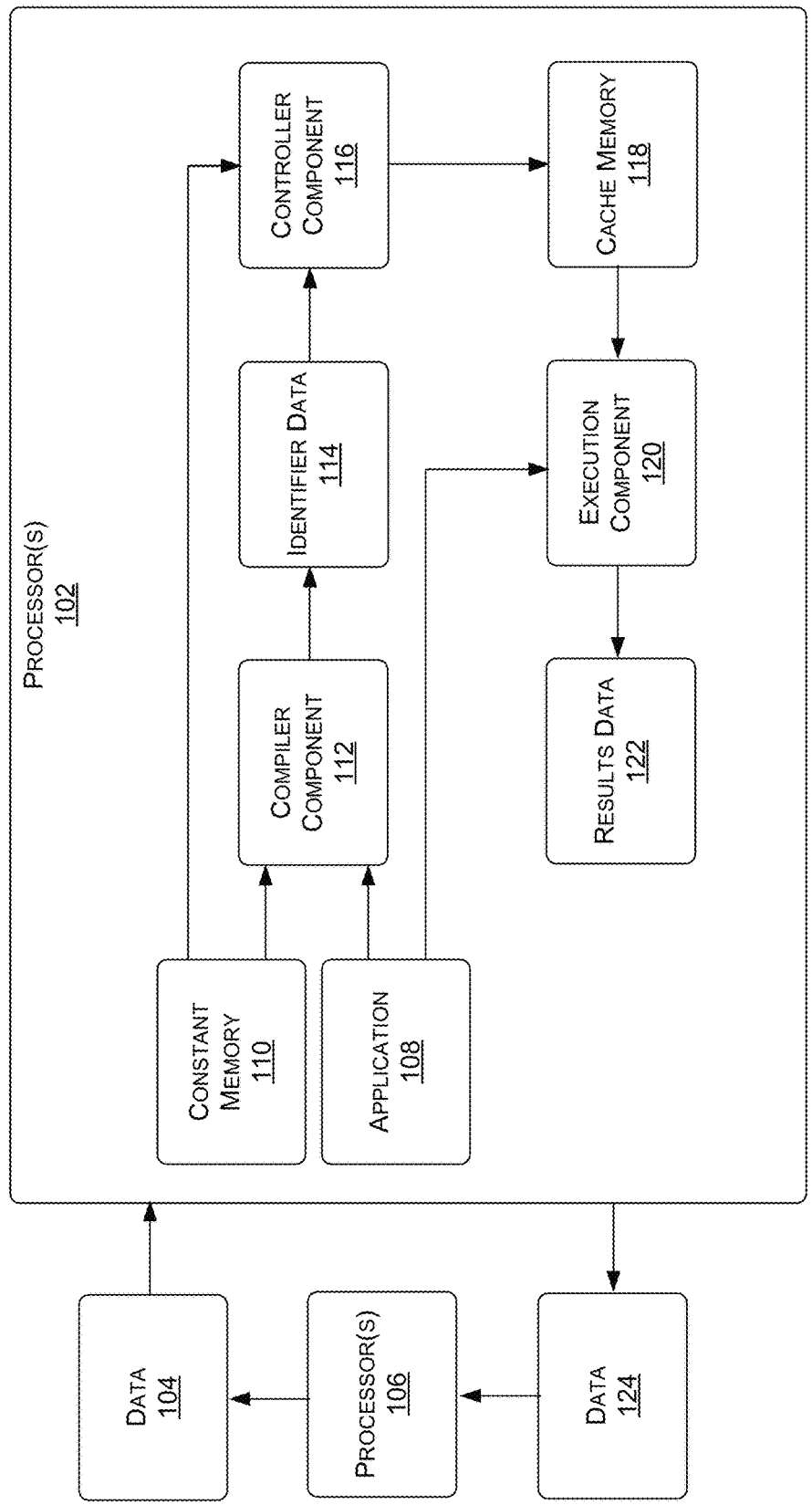
FIG. 1 illustrates an example data flow diagram for a process of partitioning a constant memory into segments for storing data in a cache memory, in accordance with some embodiments of the present disclosure.

Systems and methods are disclosed related to constant memory segmentation for autonomous systems and applications. Disclosed embodiments may be comprised in a variety of different systems such as streaming systems (e.g., game streaming systems), automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for processing data, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

For instance, a first processor(s), such as a graphics processing unit (GPU), may receive data from a second processor(s), such as a central processing unit (CPU). The data may represent at least constants, such as read-only values, that are stored by the first processor(s) in a constant memory. For instance, the constants may include, but are not limited to, grid parameters, kernel parameters, function parameters, user constants, and/or any other types of constants that are used by the kernel and/or the application. In some examples, the constant memory may include a set configuration, where the constants are sparsely distributed throughout the constant memory. For instance, one or more first regions of the constant memory may include the constants, one or more second regions of the constant memory may be reserved (e.g., for future use), one or more third regions of the constant memory may include data that is not used by the application and/or the kernel, and/or so forth. Additionally, the first regions(s), the second region(s), and the third region(s) may be distributed between one another.

The first processor(s) (e.g., a compiler executed using the first processor(s)) may be configured to partition the constant memory into a number of segments. As described herein, the number of segments may include, but is not limited to, one segment, two segments, five segments, ten segments, fifty segments, one hundred segments, and/or any other number of segments. In some examples, the first processor(s) may partition the constant memory into equally sized segments. For instance, each segment may include 5 kilobytes, 10 kilobytes, 50 kilobytes, 100 kilobytes, and/or any other size. In such an example, the size may be fixed, defined by a user, optimally computed from analysis, and/or determined using one or more additional and/or alternative techniques. Additionally, or alternatively, in some examples, the first processor(s) may partition the constant memory into varying sized segments. For a first example, the first processor(s) may analyze the application in order to determine which data (e.g., constants) from the constant memory the kernel and/or the application use when executing. The first processor(s) may then determine a first segment(s) of the constant memory corresponding to that data and/or a second segment(s) of the constant memory corresponding to other data. For a second example, the first processor(s) may analyze the constant memory in order to determine different regions associated with the constant memory. The first processor(s) may then determine the segments as corresponding to the regions.

The first processor(s) (e.g., the processor executing the compiler) may then generate data (referred to, in some examples, as "identifier data") associated with the segments. For a first example, the identifier data may represent a bitmask associated with the segments, where a segment(s) that is to be fetched from the constant memory and stored in a cache memory is associated with a first value (e.g., 0, 1, etc.) and a segment(s) that should not be fetched from the constant memory and/or should not be stored in the cache memory is associated with a second, different value (e.g., 0, 1, etc.). For a second example, the identifier data may represent an address(s) associated with the segment(s) that is to be fetched from the constant memory and/or stored in the cache memory and/or an address(es) associated with the segment(s) that should not be fetched from the constant memory and/or should not be stored in the cache memory. In such an example, an address associated with a segment may include a starting location (e.g., a starting byte) and a length (e.g., a length in bytes), a starting location (e.g., a starting byte) and an ending location (e.g., an ending byte), and/or any other type of address. The first processor(s) may then store the identifier data, such as in the kernel's binary, the compiler's binary, and/or at any other location of in the filesystem.

While these examples describe storing the identifier data in the filesystem, in other examples, the identifier data may be stored at another location. For instance, in some examples, similar processes may be performed "on-the-fly" using just-in-time compilation when the application is initially launched in order to generate the identifier data. The identifier data may then be populated in the launch descriptor, which may be in random access memory (RAM) and/or any other type of memory. In other words, the identifier data may be stored in the filesystem and/or at any other location.

The first processor(s) (e.g., a cache controller of the first processor(s)) may then use the identifier data associated with the segments in order to store a portion of the data (e.g., constants) from the constant memory in a cache memory, such as a cache memory of the first processor(s). For a first example, such as when the identifier data represents the bitmask, the first processor(s) may fetch data from the segment(s) that is associated with the first value and then store that data in the cache memory. For a second example, such as when the identifier data represents the address(es), the first processor(s) may fetch the data from the segment(s) that is associated with the address(es) to be fetched and then store that data in the cache memory. In either example, the first processor(s) may only store a portion of the data from the constant memory, which may at least reduce the latency, reduce the rate of missing constants, reduce the amount of data stored in the cache memory, reduce the amount of the cache memory that is needed, and/or provide one or more additional improvements.

In some examples, the first processor(s) may use one or more techniques when fetching the data from the segment(s) and/or storing the data from the segment(s) in the cache memory. For a first example, the first processor(s) may fetch and then store data from an initial segment(s) at a first time, such as during a launch of a kernel, and then fetch and store data from a remaining segment(s) at a second time, such as before the application needs the data from the remaining segment(s). In such an example, the identifier data may indicate the segment(s) for initial storing and/or the segment(s) for later storing. For a second example, the first processor(s) may use a priority and/or order for fetching and storing data from the segments, such that data from a first segment is fetched and then stored, followed by data from a second segment being fetched and then stored, and so forth. In such an example, the identifier data (and/or any other stored data) may indicate the priority and/or order for fetching the segments. For a third example, if at least two kernels (e.g., an initial kernel and then another, subsequent kernel) use the same data from the same segment(s), then the first processor(s) may cause that data from the segment(s) to remain stored in the cache memory for use by each of the kernels (e.g., the first processor(s) may cause the data to remain in the cache memory when the other kernel is launched).

While the examples herein describe the first processor(s) as including a GPU(s) and the second processor(s) as including a CPU(s), in other examples, the first processor(s) and/or the second processor(s) may include any other type of processor. Additionally, while the examples herein describe the memory that initially stores the data (e.g., the constants) as including a constant memory, in other examples, the memory may include any other type of memory.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing operations using one or more (large) language models, systems for performing light transport simulation, systems for performing collaborative content creation for 3D assets, systems implemented at least partially using cloud computing resources, and/or other types of systems.

FIG. 1 illustrates an example data flow diagram for a process 100 of partitioning a constant memory into segments for storage in a cache memory, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include a first processor(s) 102 receiving data 104 from a second processor(s) 106. For instance, in some examples, the first processor(s) 102 may include a first type of processor, such as a GPU, and the second processor(s) 106 may include a second type of processor, such as a CPU. However, in other examples, the first processor(s) and/or the second processor(s) may include any other type of processor. The data 104 may include at least a portion of an application 108, where data from the application, such as constants, are stored in a constant memory 110 of the first processor(s) 102. For instance, and as described herein, the constant memory 110 may store at least the constants, such as grid parameters, kernel parameters, function parameters, user constants, and/or any other type of constants that are used by kernels and/or the application 108 when executing. In some examples, the constants may include read-only values that are used by the kernels and/or the application when executing.

In some examples, the constant memory 110 may include a set configuration, where the constants are sparsely distributed throughout the constant memory 110 in various regions. As described herein, a region may include one or more groups of constants, such as one or more groups of constants that collectively describe one or more attributes of an application, one or more groups of constants defined by a user, and/or the like. For example, one or more first regions of the constant memory 110 may include the constants, one or more second regions of the constant memory 110 may be reserved (e.g., include reserved addresses for future use), one or more third regions of the constant memory 110 may include data that is not used by the kernel and/or the application 108 (e.g., data that is not relevant for the application 108), and/or so forth. Additionally, the first regions(s), the second region(s), and the third region(s) may be distributed between one another. As such, the constants may be sparsely located throughout the regions of the constant memory 110.

For instance, FIG. 2 illustrates an example of a layout of a constant memory 202 (which may represent, and/or include, the constant memory 110), in accordance with some embodiments of the present disclosure. As shown, the constant memory 202 includes six different regions 204(1)-(6) (also referred to singularly as "region 204" or in plural as "regions 204"). However, in other examples, a constant memory may include any other number of regions, such as one region, two regions, five regions, ten regions, fifty regions, one hundred regions, one thousand regions, and/or the any other number of regions. Additionally, in the example of FIG. 2, one or more (e.g., each) of the regions 204 may include a specific functionality associated with the constant memory 202. For example, the first region 204(1) of the constant memory 202 may be reserved, the second region 204(2) of the constant memory 202 may include constants, the third region 204(3) of the constant memory 202 may include constants, the fourth region 204(4) of the constant memory 202 may include data that is irrelevant to an application, the fifth region 204(5) of the constant memory 202 may be reserved, and the sixth region 204(6) of the constant memory 202 may include constants. However, in other examples, one or more of the regions 204 may include additional and/or alternative functionality.

While the example of FIG. 2 indicates that the regions 204 of the constant memory 202 are contiguously located in memory address space, in other examples, the regions 204 may not be contiguously located in memory address space. For instance, in other examples, one or more of the regions 204 may not be contiguously located proximate to one or more additional regions 204 of the constant memory 202.

Referring back to the example of FIG. 1, the process 100 may include a compiler component 112 that is configured to partition the constant memory 110 into a number of segments. As described herein, the number of segments may include, but is not limited to, one segment, two segments, five segments, ten segments, fifty segments, one hundred segments, and/or any other number of segments. In some examples, the compiler component 112 may partition the constant memory 110 into equally sized segments. For instance, each segment may include 5 kilobytes, 10 kilobytes, 50 kilobytes, 100 kilobytes, and/or any other size. In an example of partitioning the constant memory 110 using equally sized segments, the compiler component 112 may partition the constant memory 110 such that a first segment starts at byte 0 and is 6 kilobytes, a second segment starts at byte 6 and is 6 kilobytes, a third segment starts at byte 12 and is 6 kilobytes, a fourth segment starts at byte 18 and is 6 kilobytes, and/or so forth.

Additionally, or alternatively, in some examples, the compiler component 112 may partition the constant memory 110 into varying sized segments. For a first example, the compiler component 112 may analyze the constant memory 110 and, based on the analysis, detect the various regions of the constant memory 110. The compiler component 112 may then partition the constant memory 110 such that the segments correspond the regions of the constant memory 110. For instance, a first segment of the constant memory 110 may correspond to a first region of the constant memory 110, a second segment of the constant memory 110 may correspond to a second region of the constant memory 110, a third segment of the constant memory may correspond to a third region of the constant memory 110, and/or so forth. In such an example, if two consecutive regions of the constant memory 110 include similar functionality, then the two regions may be combined. For instance, if the second and third regions of the constant memory 110 include constants, then a segment may correspond to the second and third regions.

For a second example, the compiler component 112 may analyze the application 108 associated with the constants stored in the constant memory 110. Based on the analysis, the compiler component 112 may identify which portions of the constant memory 110 are used by the application 108 (e.g., which portions store constants used by the application 108) and/or which portions of the constant memory 110 are not used by the application 108 (e.g., which portions do not store constants used by the application 108). The compiler component 112 may then partition the constant memory 110 such that the segments correspond to the portions of the constant memory 110 that are used by the application 108. For instance, if the compiler component 112 determines that the application 108 uses the second region and the sixth region of the constant memory 110 (e.g., the portions), then the compiler component 112 may partition the constant memory 110 such that at least a first segment corresponds to the second region and a second segment corresponds to the sixth region.

Figure 3A:
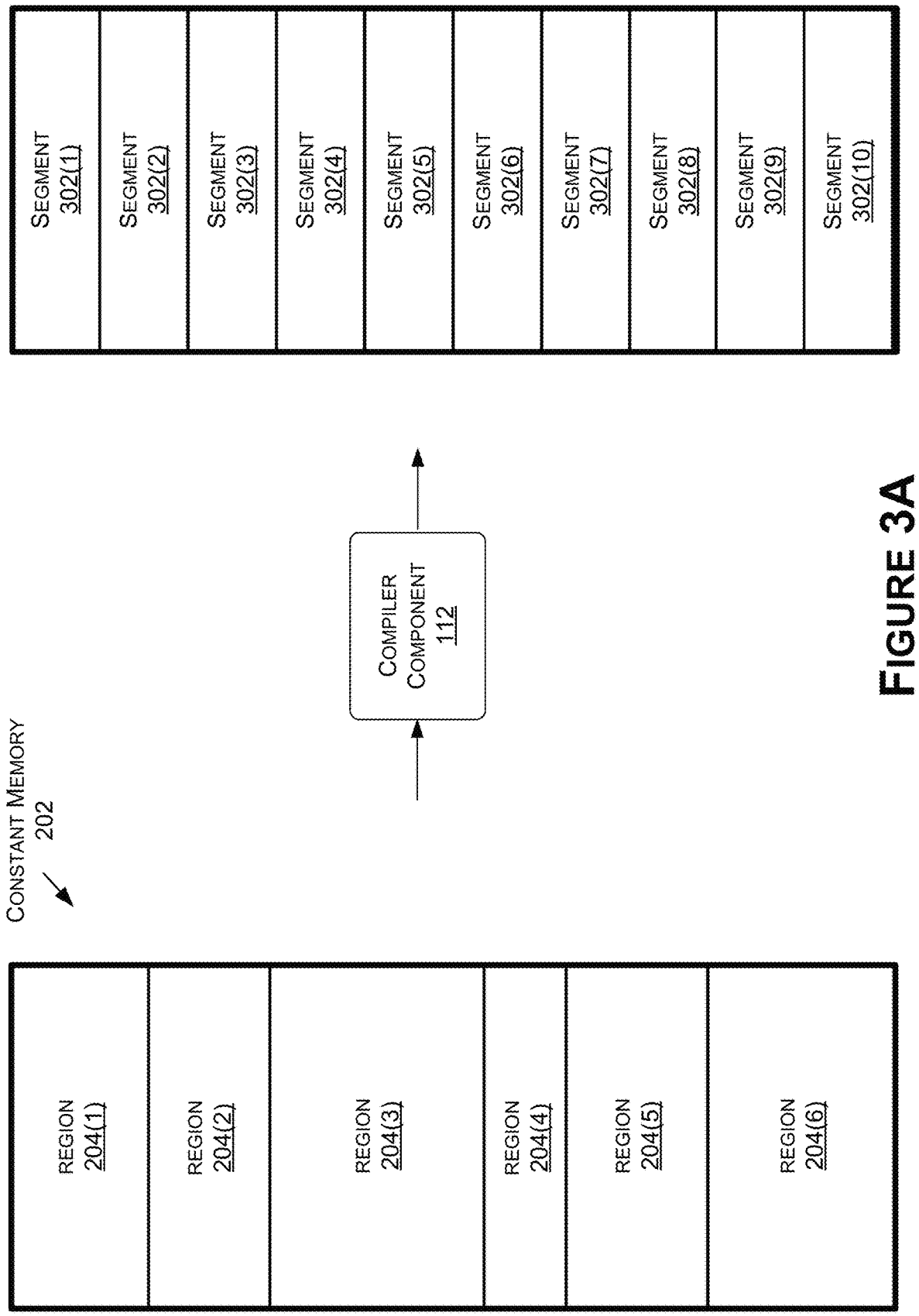
FIG. 3A illustrates an example of partitioning a constant memory into equally sized segments, in accordance with some embodiments of the present disclosure.

For instance, FIG. 3A illustrates an example of partitioning the constant memory 202 into equally sized segments, in accordance with some embodiments of the present disclosure. As shown by the example of FIG. 3A, the compiler component 112 may partition the constant memory 202 into ten equally sized segments 302(1)-(10) (also referred to singularly as "segment 302" or in plural as "segments 302"). However, in other examples, the compiler component 112 may partition the constant memory 202 into any other number of equally sized segments. As further shown by the example of FIG. 3A, the segments 302(1)-(2) correspond to the first region 204(1), the segments 302(2)-(3) correspond to the second region 204(2), the segments 302(3)-(6) correspond to the third region 204(3), the segments 302(6)-(7) correspond to the fourth region 204(4), the segments 302 (7)-(8) correspond to the fifth region 204(5), and the segments 302(8)-(10) correspond to the sixth region 204(6).

Figure 3B:
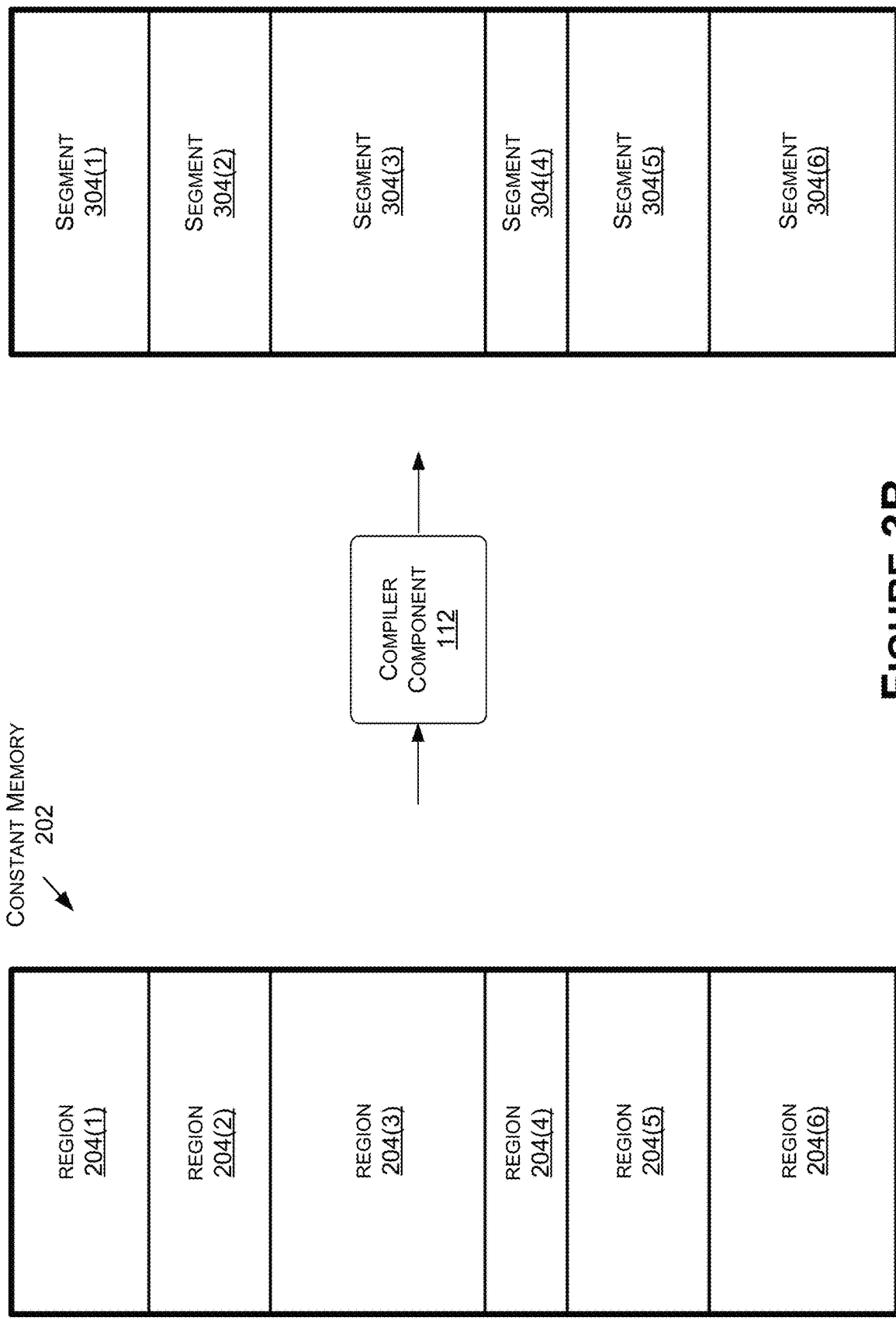
FIG. 3B illustrates an example of partitioning a constant memory into varying sized segments, in accordance with some embodiments of the present disclosure.

Additionally, FIG. 3B illustrates an example of partitioning the constant memory 202 into varying sized segments, in accordance with some embodiments of the present disclosure. As shown by the example of FIG. 3B, the compiler component 112 may partition the constant memory 202 into six segments 304(1)-(6) (also referred to singularly as "segment 304" or in plural as "segments 304") that respectively correspond to the regions 204 of the constant memory 202. For instance, the first segment 304(1) corresponds to the first region 204(1), the second segment 304(2) corresponds to the second region 204(2), the third segment 304(3) corresponds to the third region 204(3), and/or so forth. In some examples, to partition the constant memory 202 using such a technique, the compiler component 112 may initially analyze the constant memory 202 in order to identify the various regions 204. The compiler component 112 may then use the identified regions 204 to determine the segments 304 that correspond to the regions 204.

In either of the examples of FIGS. 3A and 3B, the compiler component 112 may further analyze the application in order to determine which portions (e.g., regions 204) of the constant memory 202 are used by the application. For instance, the compiler component 112 may determine that the second region 204(2), the third region 204(3), and the sixth region 204(6) are used by the application since those regions include constants associated with the application. As such, and for the example of FIG. 3A, the compiler component 112 may identify the segments 302(2)-(6) and 302 (8)-(10) as being used by the application since the segments 302(2)-(6) and 302(8)-(10) correspond to the regions 204 (2)-(3) and 204(6). Additionally, and for the example of FIG. 3B, the compiler component 112 may identify the segments 304(2)-(3) and 302(6) as being used by the application since the segments 304(2)-(3) and 304(6) correspond to the regions 204(2)-(3) and 204(6)

Referring back to the example of FIG. 1, the compiler component 112 may generate identifier data 114 associated with the segments of the constant memory 110. In some examples, the compiler component 112 may generate identifier data 114 that represents a respective identifier for each of the segments of the constant memory 110. In some examples, the compiler component 112 may generate identifier data 114 that represents one or more identifiers for one or more segments used by the application 108.

The compiler component 112 may use different techniques for generating the identifier data 114. For instance, in some examples, the identifier data 114 may represent a bitmask associated with the segments, where a segment(s) that is later to be fetched from the constant memory 110 and stored in a cache memory is associated with a first value (e.g., 0, 1, etc.) and a segment(s) that should not be fetched from the constant memory 110 and/or stored in the cache memory is associated with a second, different value (e.g., 0, 1, etc.). For a second example, the identifier data 114 may represent an address(es) associated with the segment(s) that is later to be fetched from the constant memory 110 and/or stored in the cache memory and/or an address(es) associated with a segment(s) that should not be fetched from the constant memory 110 and/or stored in the cache memory. In such an example, an address associated with a segment may include a starting location (e.g., a starting byte) and a length (e.g., a length in bytes), a starting location (e.g., a starting byte) and an ending location (e.g., an ending byte), and/or any other type of address. While these are just two examples of identifiers that may be generated for the segments of the constant memory 110, in other examples, the compiler component 112 may generate any other type of identifier that identifies the segments of the constant memory 110.

In some examples, the compiler component 112 may generate additional data (which may include part of, or be separate from, the identifier data 114). For a first example, the compiler component 112 may generate data representing an indicator (e.g., a predictive fetch flag) that indicates not only the current segment to be fetched, but also one or more references to one or more segments that should be fetched later. For a second example, the compiler component 112 may generate data representing a priority and/or an order for fetching the segments. In other words, the compiler component 112 may generate data that is later used for determining how to fetch the segments.

The compiler component 112 may then store the identifier data 114 such that the identifier data 114 is accessible for later fetching one or more of the segments of the constant memory 110. For instance, in some examples, the compiler component 112 may insert the identifier data 114 into a kernel's binary image, where the kernel later uses the segment(s) when executing. Additionally, or alternatively, in some examples, the compiler component 112 may store the identifier data 114 in the binary of the compiler component 112. While these are just a couple examples of where the compiler component 112 may store the identifier data 114, in other examples, the compiler component 112 may store the identifier data 114 in one or more additional and/or alternative locations.

While these examples describe the compiler component 112 as storing the identifier data 114 in the filesystem, in other examples, the compiler component 112 (and/or another component) may store the identifier data 114 may be stored at another location. For instance, in some examples, similar processes may be performed "on-the-fly" using just-in-time compilation when the application is initially launched in order to generate the identifier data 114. The identifier data 114 may then be populated in the launch descriptor, which may be in RAM and/or any other type of memory. In other words, the identifier data 114 may be stored in the filesystem and/or at any other location.

The process 100 may include a controller component 116 using the identifier data 114 to fetch data associated with one or more segments of the constant memory 110 for storage in a cache memory 118. The controller component 116 may use one or more techniques for fetching the segment(s). For a first example, such as when the identifier data 114 represents the bitmask associated with the segments, the controller component 116 may fetch the data associated with the segment(s) that is associated with the first value (e.g., 1) while refraining from fetching the data associated with the segment(s) that is associated with the second value (e.g., 0). For a second example, such as when the identifier data 114 represents the address(es) associated with the segment(s) that are to be fetched and/or the address(es) associated with the segment(s) that are not to be fetched, the compiler component 112 may use the address(es) associated with the segment(s) that are to be fetched in order to fetch the data for that segment(s) from the constant memory 110. While these are just a couple of examples of how the controller component 116 may fetch the data associated with the segment(s) from the constant memory 110, in other examples, the controller component 116 may use additional and/or alternative techniques to fetch the data from the constant memory 110.

For instance, FIG. 4A illustrates an example of fetching data associated with equally sized segments 302 for storage in a cache memory 402 (which may represent, and/or include, the cache memory 118), in accordance with some embodiments of the present disclosure. As described above, the first region 204(1) of the constant memory 202 may be reserved, the second region 204(2) of the constant memory 202 may include constants, the third region 204(3) memory 202 may include data that is irrelevant to an application, the fifth region 204(5) of the constant memory 202 may be reserved, and the sixth region 204(6) of the constant memory 202 may include constants. Additionally, the segments 302(1)-(2) correspond to the first region 204(1), the segments 302(2)-(3) correspond to the second region 204(2), the segments 302(3)-(6) correspond to the third region 204(3), the segments 302(6)-(7) correspond to the fourth region 204(4), the segments 302(7)-(8) correspond to the fifth region 204(5), and the segments 302(8)-(10) correspond to the sixth region 204(6).

As such, the controller component 116 may analyze identifier data 404 (which may represent, and/or include, the identifier data 114) associated with the segments 302 and, based on the analysis, determine that the identifier data 404 indicates to fetch the segments 302(2)-(3) that correspond to the second region 204(2), the segments 302(3)-(6) that correspond to the third region 204(3), and the segments 302(8)-(10) that correspond to the sixth region 204(6). The controller component 116 may then fetch the data associated with the segments 302(2)-(6) and 302(8)-(10), which is indicated by the shading, and store the data in the cache memory 402. By only storing the data associated with the segments 302(2)-(6) and 302(8)-(10), which may represent constants used by the application, the controller component 116 refrains from storing the data associated with the segments 302(1) and 302(7), which is not used by the application.

Figure 4B:
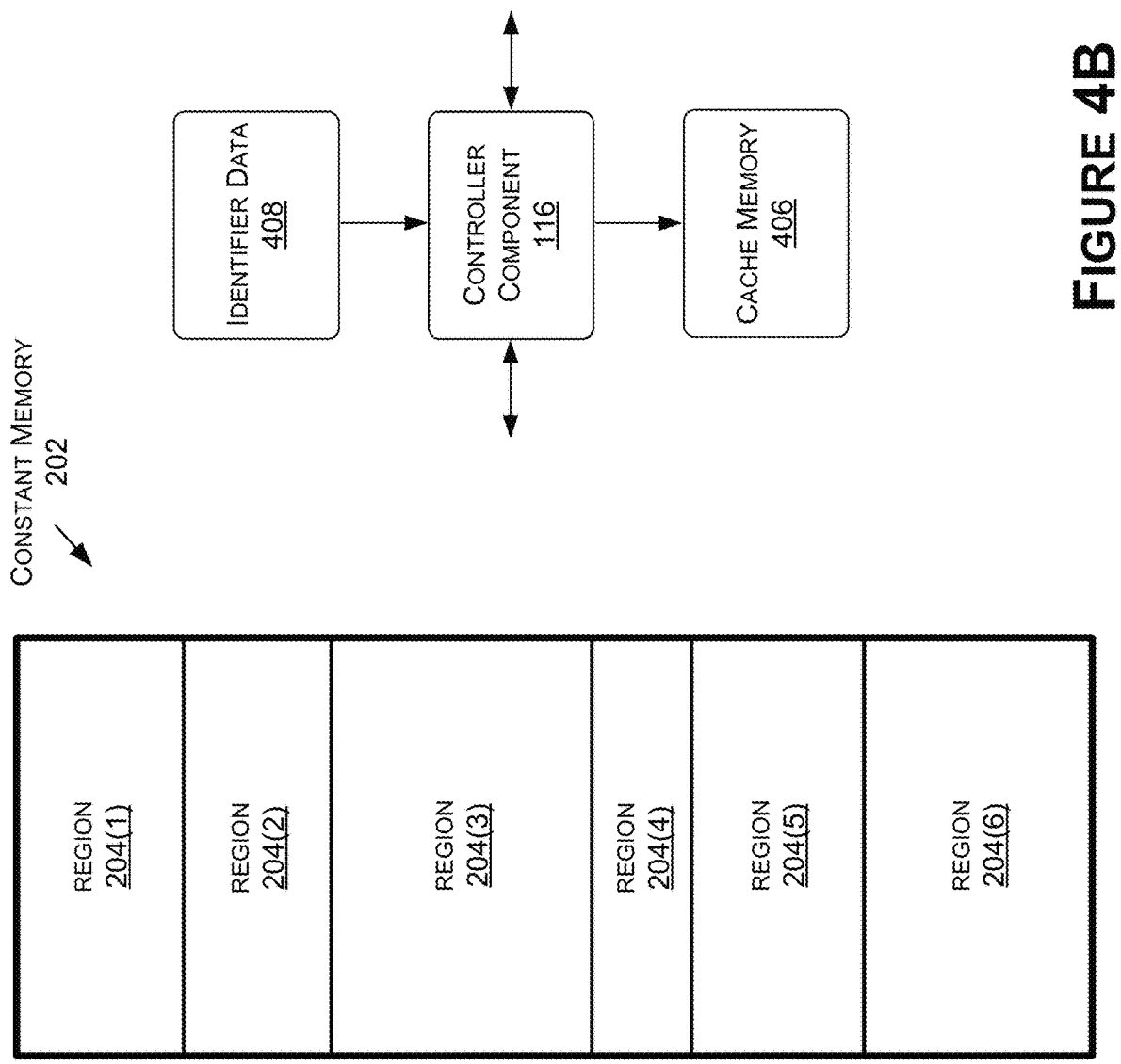
FIG. 4B illustrates an example of fetching data associated with varying sized segments for storage in a cache memory, in accordance with some embodiments of the present disclosure.

Additionally, FIG. 4B illustrates an example of fetching data associated with varying sized segments 304 for storage in a cache memory 406 (which may represent, and/or include, the cache memory 118), in accordance with some embodiments of the present disclosure. As described above, the first region 204(1) of the constant memory 202 may be reserved, the second region 204(2) of the constant memory 202 may include constants, the third region 204(3) memory 202 may include data that is irrelevant to an application, the fifth region 204(5) of the constant memory 202 may be reserved, and the sixth region 204(6) of the constant memory 202 may include constants. Additionally, the first segment 304(1) corresponds to the first region 204(1), the second segment 304(2) corresponds to the second region 204(2), the third segment 204(3) corresponds to the third region 204(3), the fourth segment 304(4) corresponds to the fourth region 204(4), the fifth segment 304(5) corresponds to the fifth region 204(5), and the sixth segment 304(6) corresponds to the sixth region 204(6).

As such, the controller component 116 may analyze identifier data 408 (which may represent, and/or include, the identifier data 114) associated with the segments 304 and, based on the analysis, determine that the identifier data 408 indicates to fetch the second segment 304(2) that corresponds to the second region 204(2), the third segment 304(3) that corresponds to the third region 204(3), and the sixth segment 304(6) that corresponds to the sixth region 204(6). The controller component 116 may then fetch the data associated with the segments 304(2)-(3) and 304(6), which is indicated by the shading, and store the data in the cache memory 406. By only storing the data associated with the segments 304(2)-(3) and 304(6), which may represent constants used by the application, the controller component 116 refrains from storing the data associated with the segments 304(1) and 304(4)-(5), which is not used by the application.

Referring back to the example of FIG. 1, the controller component 116 may use one or more techniques when fetching the data associated with the segment(s) and/or storing the data associated with the segment(s) in the cache memory 118. For a first example, the controller component 116 may fetch and then store the data associated with some (e.g., all) of the segment(s) before a launch of a kernel and/or before the application 108 needs the data from the segment(s). For a second example, the controller component 116 may fetch and then store at least data associated with an initial segment(s) at a first time, such as during a launch of a kernel, and then fetch and store data associated with a remaining segment(s) at a second time, such as before the application 108 needs the remaining segment(s). In such an example, the identifier data 114 may indicate the order for storing the data associated with the segments in the cache memory 118. For a third example, the controller component 116 may use a priority and/or order for fetching and storing the data associated with the segments, such that data associated with a first segment is fetched and then stored, followed by data associated with a second segment being fetched and then stored, and so forth. In such an example, and as described herein, the identifier data 114 (and/or other data) may indicate the priority and/or the order for fetching the segments. Still, for a fourth example, if at least two kernels (e.g., an initial kernel and then another, subsequent kernel) use the same data associated with the same segment(s), then the controller component 116 may cause the data associated with that segment(s) to remain stored in the cache memory 118 for use by each of the kernels.

Figure 5A:
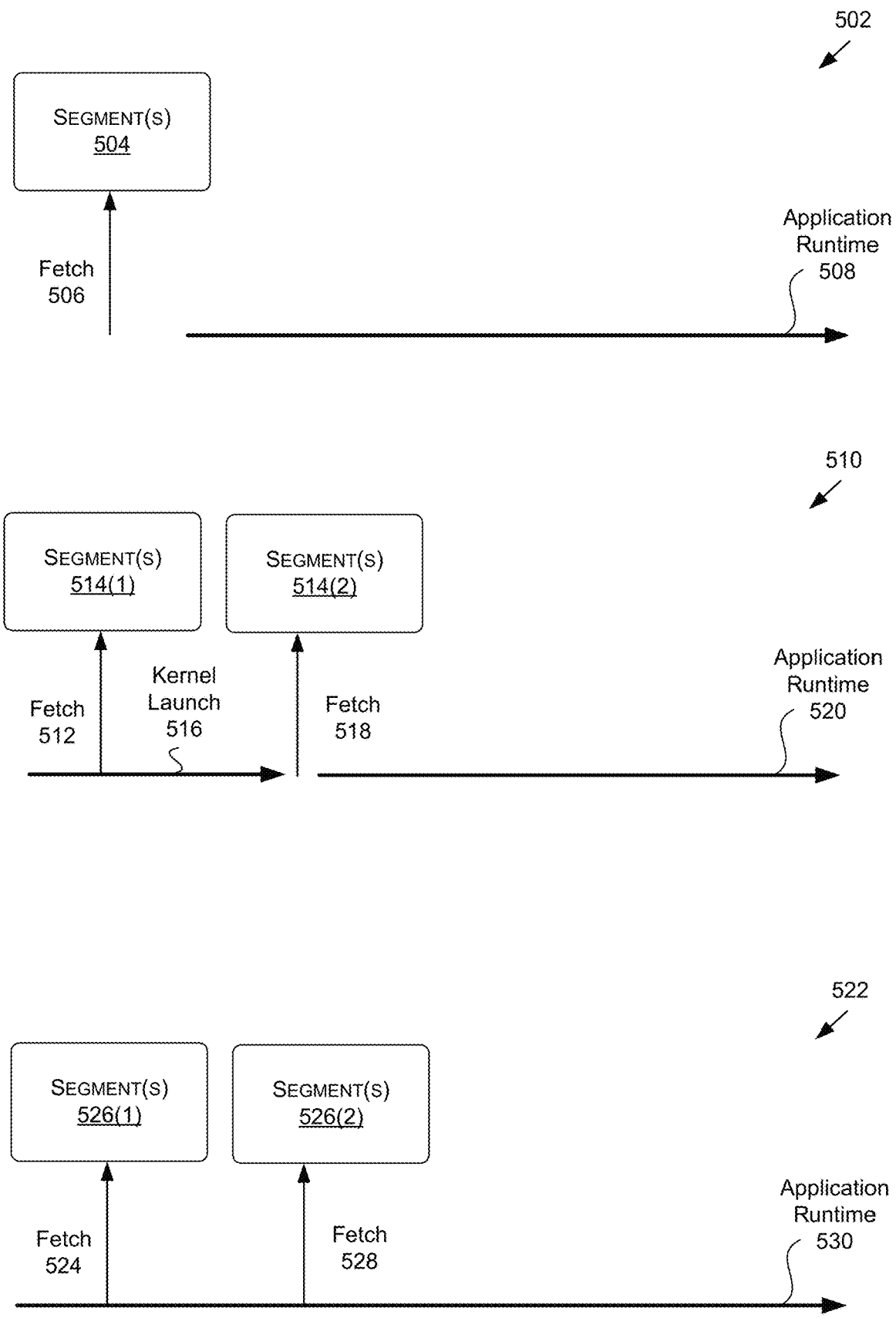
FIGS. 5A-5B illustrates examples of fetching and then storing data associated with a segment(s) of a constant memory, in accordance with some embodiments of the present disclosure.
Figure 5B:
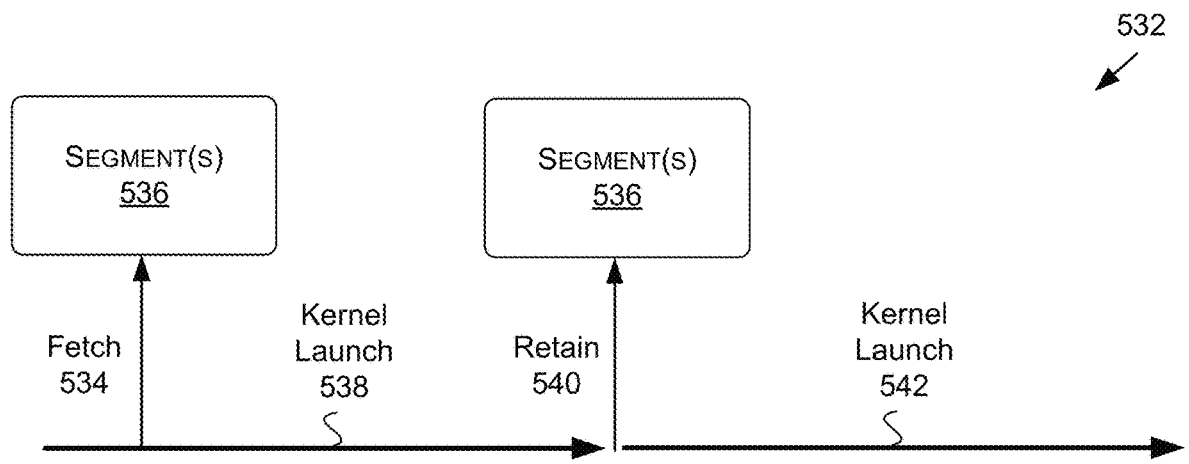

For instance, FIGS. 5A-5B illustrate examples of fetching and then storing data associated with a segment(s) of a constant memory, in accordance with some embodiments of the present disclosure. As shown, a first technique 502 for fetching data associated with a segment(s) 504 includes the controller component 116 fetching 506 the data before an application runtime 508. This way, the data is stored in the cache memory at a time that the application references the data (e.g., the constants). In some examples, the controller component 116 may fetch 506 the data based on an instruction to prefetch the data, such as before the application uses the data.

A second technique 510 for fetching data includes the controller component 116 fetching 512 data associated with a first segment(s) 514(1) at a first time, such as during a kernel launch 516, and then fetching 518 data associated with a second segment(s) 514(2) at a second time, such as before an application runtime 508 and/or before the application needs the data associated with the second segment(s) 514(2). In some examples, the identifier data may indicate the first segment(s) 514(1) to be fetched at the first time and the second segment(s) 514(2) to be fetched at the second time. For example, the compiler component 112 may analyze the application in order to determine an order associated with the application using the data (e.g., constants). The compiler component 112 may then generate the identifier data such that the first segment(s) 514(1) is associated with data that is used by the application first and the second segment(s) 514(2) is associated with data that the application uses after.

A third technique 522 for fetching includes the controller component 116 fetching 524 data associated with a first segment(s) 526(1) at a first time, determining the next data that is to be fetched after the data associated with the first segment(s) 526(1), and then fetching 528 the data associated with a second segment(s) 526(2), such as during an application runtime 530. The controller component 116 may then continue to perform these processes of determining and then fetching data associated with segments. In some examples, the identifier data may indicate the priorities and/or order associated with the segments 526(1)-(2) for fetching data. For example, the compiler component 112 may analyze the application in order to determine the priorities and/or the order associated with the application using the data (e.g., constants). The compiler component 112 may then generate the identifier data such that the identifier data indicates the priorities and/or the order for fetching the data associated with the segments 526(1)-(2).

A fourth technique 532 for fetching includes the controller component 116 fetching 534 data associated with a segment 536 for storage in a cache memory at a first time, such as during a kernel launch 538, and then retaining 540 the data associated with the segment 536 within the cache memory for another kernel launch 542. In some examples, the controller component 116 may perform such processes based on a first kernel associated with the kernel launch 538 and a second kernel associated with the kernel launch 542 both needing the data associated with the segment(s) 536. As such, the controller component 116 may cause the data associated with the segments 536 to be retained in the cache memory so that the controller component 116 does not need to again fetch the data for storage in the cache memory.

In some examples, the fourth technique 532 may be implemented using one or more processes. For a first example, a signature field associated with a segment(s) may be populated based on a hash of constant values at launch time. For instance, before the application is launched, the hash value associated with the kernel launch 542 may be checked to see if it matches the hash value associated with the kernel launch 538. If the hash values match, then the fourth technique 532 may be performed in order to retain the segments 536 in the cache memory so that the controller component 116 does not need to again fetch the data for storage. For a second example, a per-segment hash field may be introduced, such that a check may be performed for which segments are common between the kernel associated with kernel launch 536 and the kernel associated with kernel launch 542. The fourth technique 532 may then be performed in order to retain the segments 536 in the cache memory that are common between the kernels.

Referring back to the example of FIG. 1, the process 100 may include an execution component 120 executing one or more processes using the cache memory 118 and/or the application 108. For instance, the execution component 120 may represent one or more threads that execute one or more functions corresponding to one or more kernels. For example, the thread(s) may include any number of threads, such as one thread, five threads, ten threads, one hundred threads, one thousand threads, and/or any other number of threads, that execute a portion of the application 108 using the data stored in the cache memory 118. The thread(s) may be grouped into a number of blocks such as, but not limited to, one block, two blocks, five blocks, ten blocks, and/or any other number of blocks. A kernel may then be executed as a grid of these blocks. As such, the data stored in the cache memory 118 may be associated with one or more kernels that are executing as part of the execution component 120.

The process 100 may include the execution component 120 outputting, based on the executing of the one or more processes, results represented by the results data 122. For example, if the execution component 120 is processing a neural network, and the cache memory 118 stores the constants for the neural network, then the results may be the output from the neural network. However, in other examples, the results may be associated with other types of processing that is performed by the execution component 120, such as cryptographic processing, molecular dynamics simulations, algorithms, and/or any other type of processing. The first processor(s) 102 may then send the results data 122 back to the second processor(s) 106 as part of data 124.

Figure 6:
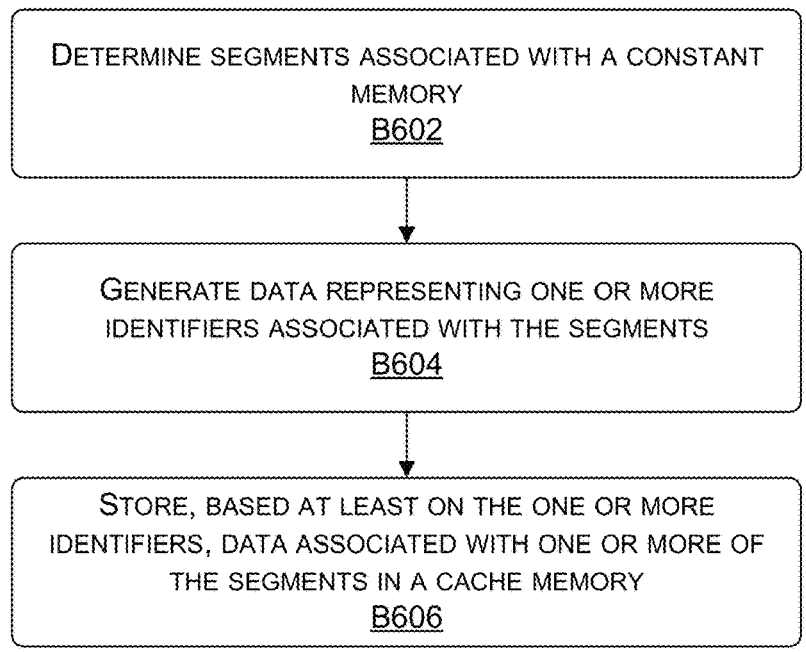
FIG. 6 illustrates a flow diagram showing a method for partitioning a constant memory into segments and then storing data associated with a portion of the segments in a cache memory, in accordance with some embodiments of the present disclosure.
Figure 7:
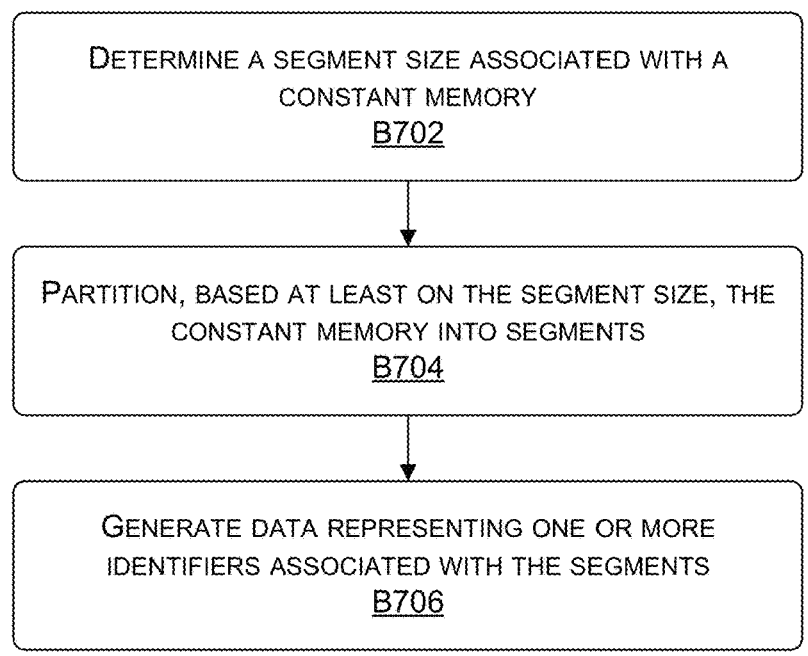
FIG. 7 illustrates a flow diagram showing a method for partitioning a constant memory into equally sized segments, in accordance with some embodiments of the present disclosure.
Figure 8:
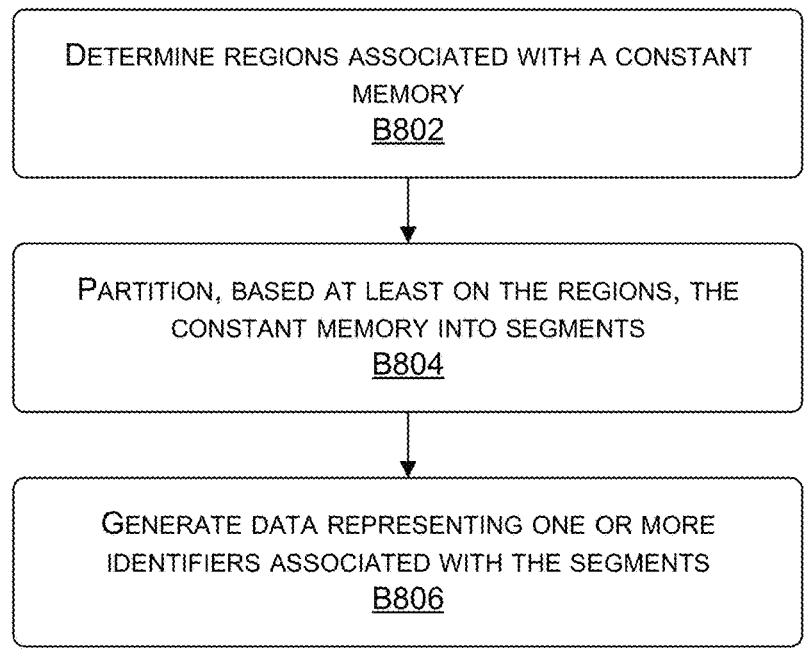
FIG. 8 illustrates a flow diagram showing a method for partitioning a constant memory into varying sized segments, in accordance with some embodiments of the present disclosure.

Now referring to FIGS. 6-8, each block of method 600, 700, and 800, described herein, comprises a computing process that may be performed using any combination of hardware, firmware, and/or software. For instance, various functions may be carried out by a processor executing instructions stored in memory. The methods 600, 700, and 800 may also be embodied as computer-usable instructions stored on computer storage media. The methods 600, 700, and 800 may be provided by a standalone application, a service or hosted service (standalone or in combination with another hosted service), or a plug-in to another product, to name a few. In addition, the methods 600, 700, and 800 are described, by way of example, with respect to FIG. 1. However, these methods 600, 700, and 800 may additionally or alternatively be executed by any one system, or any combination of systems, including, but not limited to, those described herein.

FIG. 6 is a flow diagram showing a method 600 of partitioning a constant memory into segments and then storing data associated with a portion of the segments in a cache memory, in accordance with some embodiments of the present disclosure. The method 600, at block B602, may include determining segments associated with a constant memory. For instance, the first processor(s) 102 (e.g., the compiler component 112) may determine the segments associated with the constant memory 110. As described herein, the constant memory 110 may store at least constants associated with the application 108. In some examples, the first processor(s) 102 may determine the segments by partitioning the constant memory 110 into equally sized segments. In some examples, the first processor(s) 102 may determine the segments by partitioning the constant memory 110 using one or more additional techniques, such as based on the regions of the constant memory 110 and/or the portions of the constant memory 110 that store data used by the application 108.

The method 600, at block B604, may include generating data representing one or more identifiers associated with the segments. For instance, the first processor(s) 102 (e.g., the compiler component 112) may generate the identifier data 114 associated with the segments. In some examples, the identifier data 114 may represent a bitmask that includes values associated with the segments. In some examples, the identifier data 114 may represent one or more addresses associated with the segments. In some examples, the identifier data 114 may represent a respective identifier associated with each segment. Still, in some examples, the identifier data 114 may represent a respective identifier associated with specific types of segments. For example, the identifier data 114 may represent an identifier(s) associated with a segment(s) that is to later be stored in the cache memory 118, but not include an identifier(s) associated with a segment(s) that is not to be stored in the cache memory 118.

The method 600, at block B606, may including storing, based at least on the one or more identifiers, data associated with one or more of the segments in a cache memory. For instance, the first processor(s) 102 (e.g., the controller component 116) may use the identifier data 114 to fetch the data associated with the segment(s) from the constant memory 110. The first processor(s) 102 may then store the data associated with the segment(s) in the cache memory 118. As described herein, the execution component 120 may then access the data from the cache memory 118 for processing.

FIG. 7 is a flow diagram showing a method 700 of partitioning a constant memory using equal sized segments, in accordance with some embodiments of the present disclosure. The method 700, at block B702, may include determining a segment size associated with a constant memory. For instance, the first processor(s) 102 (e.g., the compiler component 112) may determine the segment size for partitioning the constant memory 110. In some examples, the first processor(s) 102 may determine the segment size using one or more processors. For a first example, the first processor(s) 102 may determine the segment size such that the constant memory 110 is partitioned into a specific number of segments. For a second example, the first processor(s) 102 may determine the segment size based on the number of regions associated with the constant memory 110.

The method 700, at block B704, may include partitioning, based at least on the segment size, the constant memory into segments. For instance, the first processor(s) 102 (e.g., the compiler component 112) may partition the constant memory 110 into the segments using the segment size. As such, and in some examples, each segment may include the same and/or substantially the same size.

The method 700, at block B706, may include generating data representing one or more identifiers associated with the segments. For instance, the first processor(s) 102 (e.g., the compiler component 112) may generate the identifier data 114 associated with the segments. In some examples, the identifier data 114 may represent a bitmask that includes values associated with the segments. In some examples, the identifier data 114 may represent one or more addresses associated with the segments. In some examples, the identifier data 114 may represent a respective identifier associated with each segment. Still, in some examples, the identifier data 114 may represent a respective identifier associated with specific types of segments.

FIG. 8 is a flow diagram showing a method 800 of partitioning a constant memory using varying sized segments, in accordance with some embodiments of the present disclosure. The method 800, at block B802, may include determining regions associated with a constant memory. For instance, the first processor(s) 102 (e.g., the compiler component 112) may determine the regions associated with the constant memory 110. As described herein, the constant memory 110 may include a set configuration, where the constants are sparsely distributed throughout the constant memory 110. For example, one or more first regions of the constant memory 110 may include the constants, one or more second regions of the constant memory 110 may be reserved (e.g., include reserved addresses for future use), one or more third regions of the constant memory 110 may include data that is not used by the kernel and/or the application 108 (e.g., data that is not relevant for the application 108), and/or so forth. Additionally, the first regions(s), the second region(s), and the third region(s) may be distributed between one another.

The method 800, at block B804, may include partitioning, based at least on the regions, the constant memory into segments. For instance, the first processor(s) 102 (e.g., the compiler component 112) may partition the constant memory 110 into the segments using the regions. For example, a first segment may correspond to a first region, a second segment may correspond to a second region, a third segment may correspond to a third region, and/or so forth.

The method 800, at block B806, may include generating data representing one or more identifiers associated with the segments. For instance, the first processor(s) 102 (e.g., the compiler component 112) may generate the identifier data 114 associated with the segments. In some examples, the identifier data 114 may represent a bitmask that includes values associated with the segments. In some examples, the identifier data 114 may represent one or more addresses associated with the segments. In some examples, the identifier data 114 may represent a respective identifier associated with each segment. Still, in some examples, the identifier data 114 may represent a respective identifier associated with specific types of segments.

Example Computing Device

Figure 9:
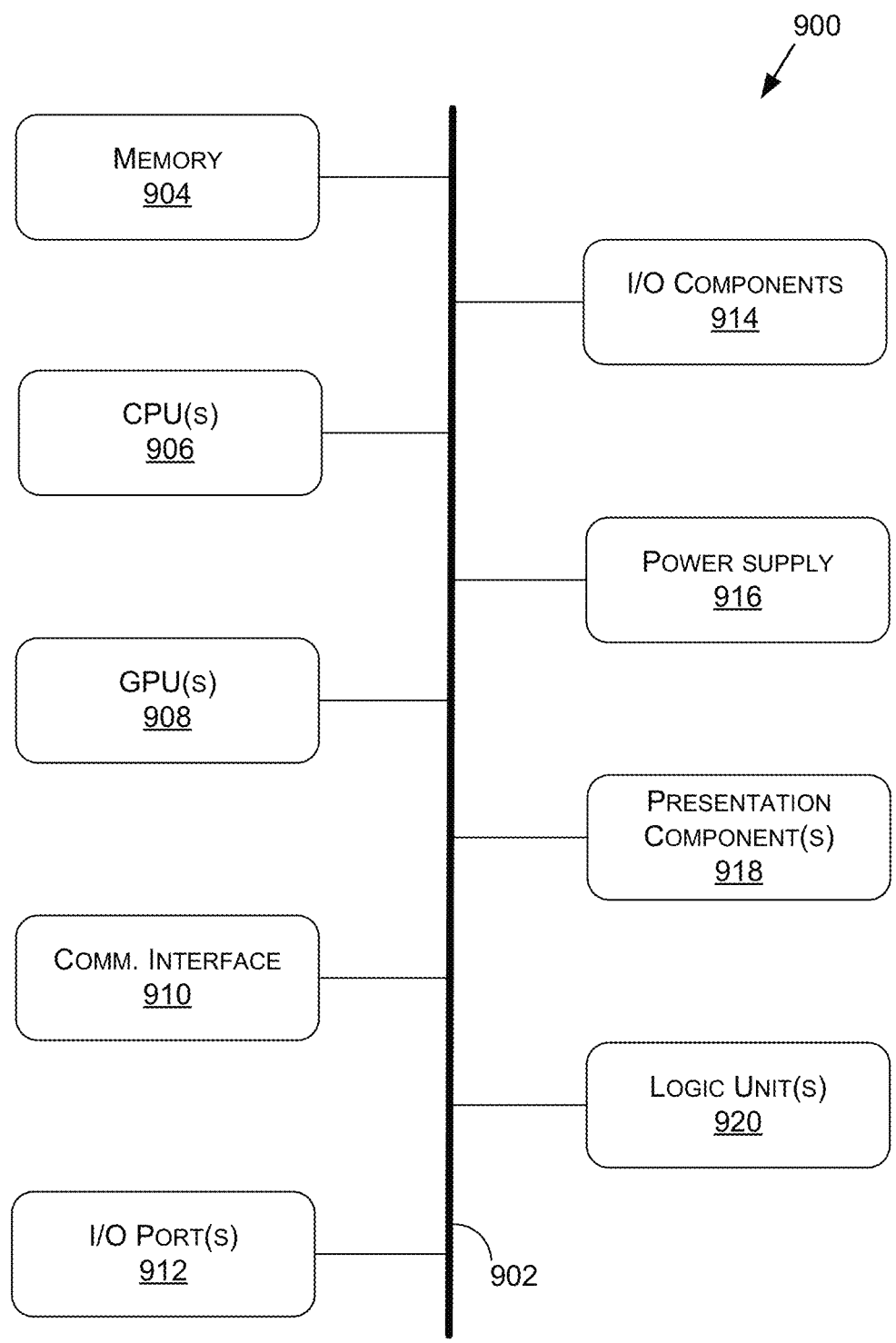
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
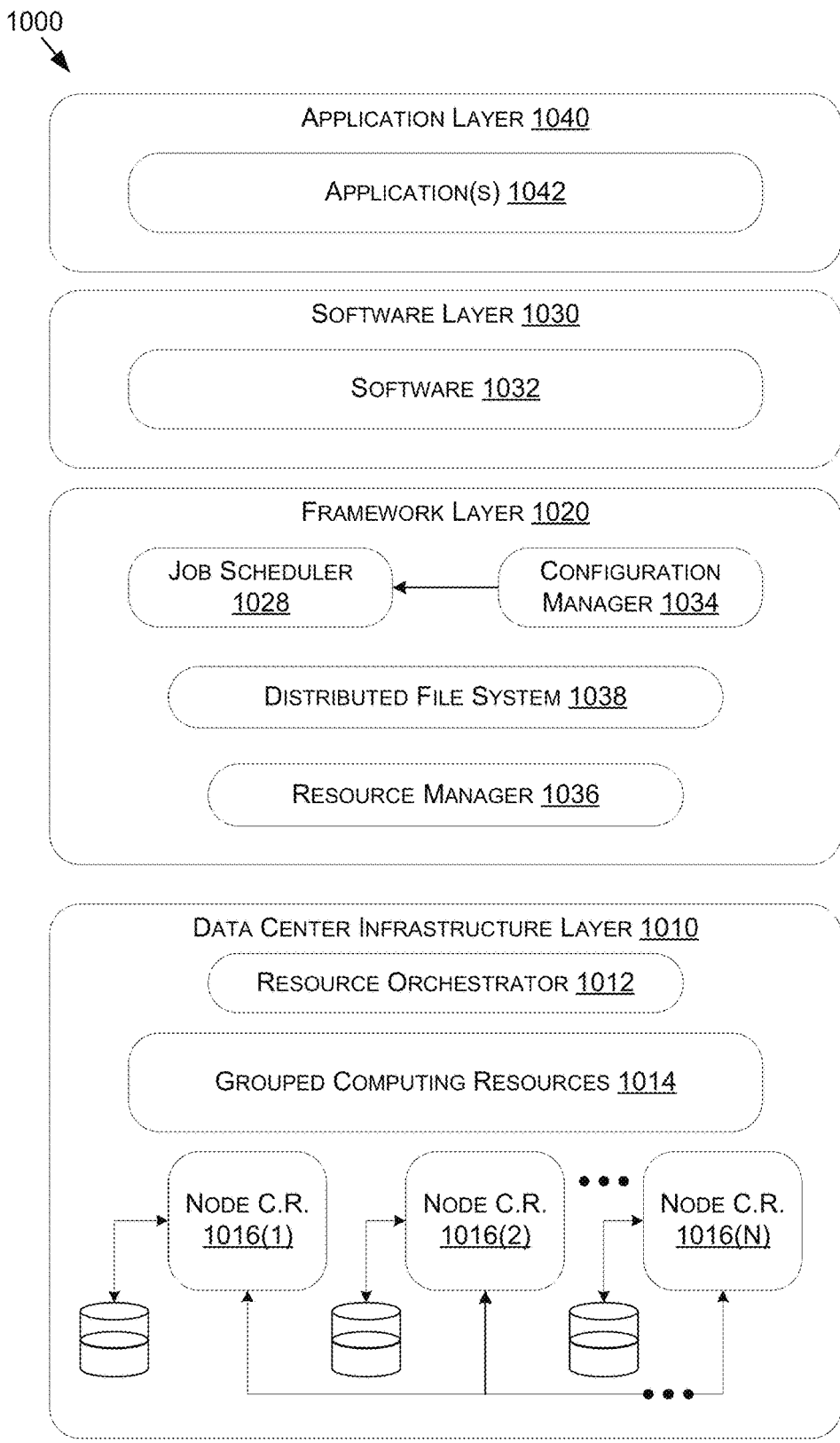
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1028, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1028 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1028. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016 (N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

partitioning a constant memory according to a segment size;

determining, based at least on the partitioning, at least a first segment and a second segment, the first segment and the second segment each having a size corresponding to the segment size;

generating data representing a first identifier associated with the first segment and a second identifier associated with the second segment; and storing, based at least on the first identifier, data associated with the first segment of the constant memory in a cache memory corresponding to one or more processing units.

2. The method of claim 1, further comprising refraining from storing, based at least on the second identifier, data associated with the second segment in the cache memory.

3. The method of claim 1, wherein:
the first identifier comprises a first value associated with a bitmask;
the second identifier comprises a second value associated with the bitmask; and
the storing the data associated with the first segment in the cache memory comprises:
fetching, based at least on the first segment being associated with the first value, the data associated with the first segment from the constant memory; and
storing the data associated with the first segment in the cache memory.

4. The method of claim 1, wherein:
the first identifier comprises a first address associated with the first segment;
the second identifier comprises a second address associated with the second segment; and
the storing the data associated with the first segment in the cache memory comprises:
fetching, using the first address, the data associated with the first segment from the constant memory; and
storing the data associated with the first segment in the cache memory.

5. The method of claim 1, further comprising:
after the storing the data associated with the first segment, launching a kernel associated with the constant memory; and
after the launching the kernel, storing, based at least on the second identifier, data associated with the second segment in the cache memory.

6. The method of claim 1, further comprising:
based at least on the storing the data associated with the first segment, determining that an application uses data associated with the second segment after the data associated with the first segment; and
based at least on the application using the data associated with the second segment after the data associated with the first segment, storing, based at least on the second identifier, the data associated with the second segment in the cache memory.

7. The method of claim 1, further comprising:
determining that a first kernel uses the data associated with the first segment, wherein the storing the data associated with the first segment is based at least on the first kernel using the data associated with the first segment;
determining that a second kernel, which is launched after the first kernel, uses the data associated with the first segment; and
based at least on the second kernel using the data associated with the first segment, causing at least a portion the data associated with the first segment to remain stored in the cache memory after the second kernel is launched.

8. A processor comprising:
one or more processing units to:
determine a plurality of segments associated with a constant memory of the one or more processing units;
generate data representing a first value of a bitmask to associate with one or more first segments of the plurality of segments and a second value of the bitmask to associated with one or more second segments of the plurality of segments;
retrieve, based at least on the one or more first segments being associated with the first value, data associated with the one or more first segments from the constant memory; and
store the data associated with the one or more first segments in a cache memory of the one or more processing units.

9. The processor of claim 8, wherein the one or more processing units are further to refrain from storing data associated with the one or more second segments of the plurality of segments in the cache memory.

10. The processor of claim 8, wherein the determination of the plurality of segments associated with the constant memory comprises:
partitioning the constant memory using a segment size; and
determining, based at least on the partitioning, the plurality of segments as including the segment size.

11. The processor of claim 8, wherein the determination of the plurality of segments associated with the constant memory comprises:
analyzing at least one of an application or the constant memory;
determining, based at least on the analyzation, a plurality of regions associated with the constant memory, an individual region of the plurality of regions storing a type of data; and
determining that the plurality of segments correspond to the plurality of regions.

12. The processor of claim 8, wherein:
the first value are associated with storing the data associated with the one or more first segments in the cache memory; and
the second value are associated with refraining from storing second data associated with the one or more second segments.

13. The processor of claim 8, wherein the one or more processing units are further to:
after the data associated with the one or more first segments is stored in the constant memory, launch a kernel associated with the constant memory; and
after the kernel is launched, store data associated with one or more third segments of the plurality of segments in the cache memory.

14. The processor of claim 8, wherein the one or more processing units are further to:
based at least on the data associated with the one or more first segments being stored in the constant memory, determine that an application uses data associated with one or more third segments of the plurality of segments after the data associated with the one or more first segments; and
based at least on the application using the data associated with the one or more third segments after the data associated with the one or more first segments, store the data associated with the one or more third segments in the cache memory.

15. The processor of claim 9, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing operations using a language model;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

16. A system comprising:
one or more processing units to:
- segment a constant memory into at least a first segment associated with first data and a second segment associated with second data;
- store the first data in a cache memory;
- determine that the second data is used after the first data; and
- based at least on the second data being used after the first data, store the second data in the cache memory.

17. The system of claim 16, wherein the constant memory is segmented into the at least the first segment associated with the first data and the second segment associated with the second data based at least on one or more of:
- a constant segment size associated with the first segment and the second segment;
- an application that uses at least one of the first data associated with the first segment or the second data associated with the second segment; or
- a layout associated with the constant memory.

18. The system of claim 16, wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for performing operations using a language model;
- a system for generating synthetic data;
- a system incorporating one or more virtual machines (VMs);
- a system implemented at least partially in a data center; or
- a system implemented at least partially using cloud computing resources.

19. The method of claim 1, further comprising determining the segment size based at least on at least one of:
- input data indicating the segment size;
- an analysis of the constant memory;
- an analysis of an application; or
- a layout of the constant memory.

20. The system of claim 16, wherein the determination that the second data is used after the first data comprises determining that an application associated with the constant memory uses the second data after the first data.

* * * * *